(12) United States Patent
Feinmesser et al.

(10) Patent No.: US 10,051,423 B1
(45) Date of Patent: Aug. 14, 2018

(54) TIME OF FLIGHT ESTIMATION USING A CONVOLUTIONAL NEURAL NETWORK

(71) Applicant: Apple Inc., Cupertino, CA (US)

(72) Inventors: Yoav Feinmesser, Tel-Aviv (IL); Rafi Vitory, Or-Akiva (IL); Ariel Landau, Ramat-Gan (IL); Barak Sagiv, Kochav Yair (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/612,553

(22) Filed: Jun. 2, 2017

(51) Int. Cl.
| | | |
|---|---|---|
| *H04W 24/00* | (2009.01) | |
| *H04W 4/02* | (2018.01) | |
| *H04W 8/00* | (2009.01) | |
| *H04L 12/707* | (2013.01) | |
| *H04W 84/12* | (2009.01) | |

(52) U.S. Cl.
CPC ............. *H04W 4/023* (2013.01); *H04L 45/24* (2013.01); *H04W 8/005* (2013.01); *H04W 84/12* (2013.01)

(58) Field of Classification Search
CPC ..... H04W 4/023; H04W 8/005; H04W 84/12; H04L 48/24
USPC ...................................................... 455/456.6
See application file for complete search history.

(56) References Cited

U.S. PATENT DOCUMENTS

| | | | | |
|---|---|---|---|---|
| 8,629,803 | B2 * | 1/2014 | Pattabiraman | G01S 19/11 342/357.29 |
| 2001/0022558 | A1 * | 9/2001 | Karr, Jr. | G01S 1/026 342/450 |
| 2003/0146871 | A1 * | 8/2003 | Karr | G01S 1/026 342/457 |
| 2013/0172020 | A1 * | 7/2013 | Aweya | G01S 5/0252 455/457 |
| 2014/0329540 | A1 * | 11/2014 | Duggan | H04W 4/02 455/456.1 |
| 2017/0237484 | A1 * | 8/2017 | Heath | H04B 10/07953 398/26 |
| 2017/0328983 | A1 * | 11/2017 | Volgyesi | G01S 5/22 |

OTHER PUBLICATIONS

Abdulwahhab; "Mobile Position Estimation based on Three Angles of Arrival using an Interpolative Neural Network"; International Journal of Computer Applications (0975-8887) vol. 100, No. 7; Aug. 1-5, 2014; 5 pages.
Ramirez; "Time of Flight in Wireless Networks as Information Source for Positioning"; Dissertation, Nov. 29, 2010; 161 pages.

* cited by examiner

*Primary Examiner* — William Nealon
(74) *Attorney, Agent, or Firm* — Meyertons Hood Kivlin Kowert & Goetzel, P.C.; Jeffrey C. Hood

(57) ABSTRACT

Embodiments herein relate to using a convolutional neural network (CNN) for time-of-flight estimation in a wireless communication system. A wireless device may receive, from a remote device, wireless communications including a first transmission time value associated with the transmission of the wireless communications. The wireless device may perform a coarse time-of-arrival (TOA) estimation on the wireless communications received from the remote device. The coarse TOA estimation may be used to generate an estimated impulse response, which may be input to a CNN associated with the wireless device to calculate a line-of-sight estimate. The wireless device may determine a range between the wireless device and the remote device based on the transmission time value and the line-of-sight estimate.

20 Claims, 10 Drawing Sheets

TIME OF FLIGHT ESTIMATION USING A CONVOLUTIONAL NEURAL NETWORK

FIELD

The present disclosure relates to wireless communication systems, including techniques for performing time-of-flight estimation in such systems, e.g., IEEE 802.11 wireless systems.

DESCRIPTION OF THE RELATED ART

Wireless communication systems are increasingly widespread. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Devices that implement wireless communication technologies are commonly mobile or portable. It is often useful to estimate the position or location of such devices. For example, it may be helpful to be able to determine the location of a device that has been separated from its user or lost. It may also be desirable to estimate the position of a device for map applications, Internet search applications, social networking applications, targeted advertising, determining locations of available services such as printers, etc.

In current systems, position estimation is typically performed using GPS (Global Positioning System) technology (or GLONASS technology), which is integrated into the mobile device. However, alternative Wi-Fi-based positioning systems may be used wherein technologies like GPS and GLONASS perform poorly, e.g., when the mobile device experiences multipath issues or suffers from signal blockage due to being indoors. Some Wi-Fi-based positioning systems use time-of-flight estimation to determine the distance and position of a mobile device relative to another device, such as another mobile device or a Wi-Fi access point. However, improvements in the field are desired.

SUMMARY

This document describes, inter alia, methods for determining a range between two wireless devices in a wireless communication system, such as an IEEE 802.11 (Wi-Fi) wireless communication system, and describes wireless devices configured to implement the described methods.

In some embodiments, a wireless device may be equipped with a pretrained convolutional neural network (CNN). In some embodiments, the wireless device may be configured to perform a coarse time of arrival (TOA) estimation on wireless communications received from a remote device to generate an estimated impulse response. The wireless device may further store a transmission time value associated with the received wireless communications. The estimated impulse response may be input to the CNN, which may calculate a line of sight (LOS) estimate using a pretrained set of CNN parameters. In some embodiments, the wireless device may determine a range between the wireless device and the remote device based on the LOS estimate and the transmission time value.

In some embodiments, a pair of wireless devices (e.g., an access point and a user equipment device, or two user equipment devices) may be configured to calculate a range between them through a round-trip communication method. In these embodiments, each of the two wireless devices may separately perform coarse TOA estimation on respective wireless communications received from the other device to generate a respective estimated impulse response. In some embodiments, each wireless device may store a transmission time value associated with its respective received wireless communications. In some embodiments, each wireless device may be equipped with a pretrained CNN, which may receive the respective estimated impulse response as input to calculate a response LOS estimate using a pretrained set of CNN parameters. In some embodiments, a range may be calculated based on each of the transmission time values and LOS estimates.

The techniques described herein may be implemented in and/or used with a number of different types of devices, including but not limited to cellular phones, access points, portable media players, portable gaming devices, tablet computers, wearable computing devices, remote controls, wireless speakers, set top box devices, television systems, and computers.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
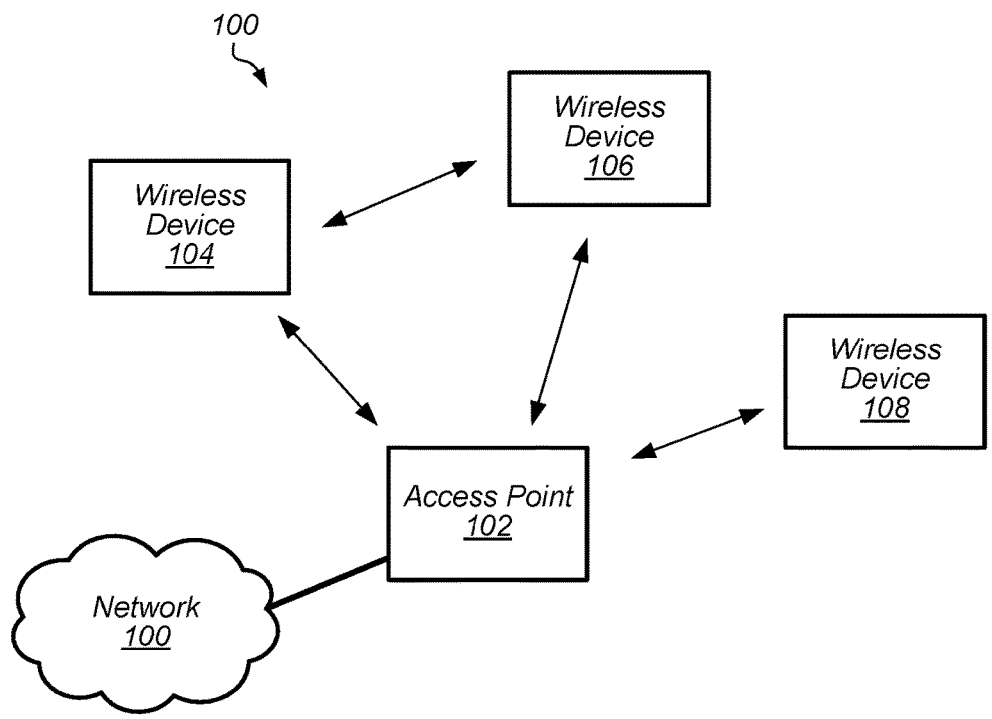
FIGS. 1-2 illustrate an example (and simplified) wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Station (STA)—any of various types of computer systems devices which are mobile or portable and which performs wireless communications. Examples of STAs include user equipment devices (UEs), mobile telephones or smart phones (e.g., iPhone™ Android™-based phones), portable gaming devices (e.g., Nintendo DS™, PlayStation Portable™, Gameboy Advance™), laptops, tablets, wearable devices (e.g., smart watch, smart glasses), PDAs, portable Internet devices, music, video, or other media players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Access Point (AP)—The term "Access Point" has the full breadth of its ordinary meaning, and at least includes a wireless communication station installed at a fixed location and used to communicate with mobile or stationary wireless devices as part of a wireless communication system, e.g., a Wi-Fi system. In some embodiments, an AP may be considered an example of a STA.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Wi-Fi—refers to short range wireless communication technology, such as that based on IEEE 802.11 wireless standards such as 802.11a, 802.11.b, 802.11g, 802.11n, 802.11-2012, 802.11ac, and/or other IEEE 802.11 standards. IEEE 802.11 technology may be referred to as "Wi-Fi" or "wireless local area network (WLAN)" technology.

Time-of-flight Estimation—this phrase includes the full breadth of its ordinary meaning, and at least includes a first device sending a waveform to a second device (or vice versa) so that the second device can use the time of arrival of the waveform to estimate its relative distance from the first device.

Figure 2:
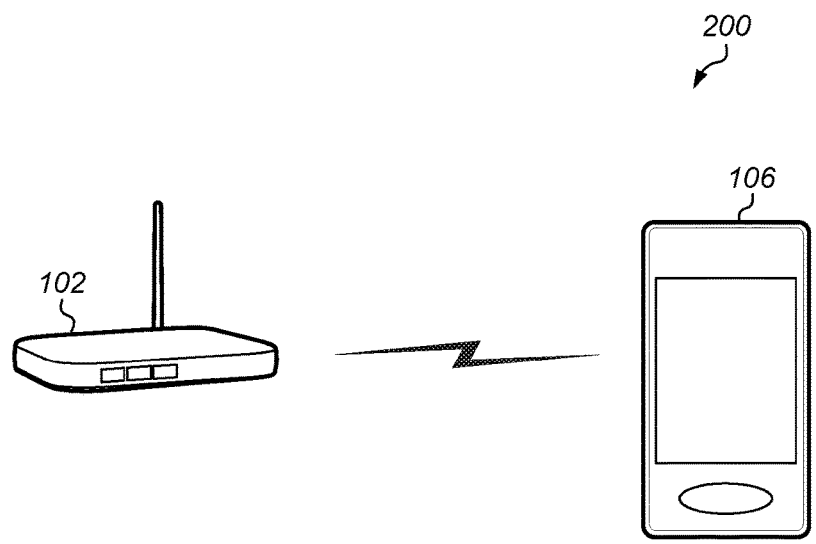

FIGS. 1-2—Communication System

FIG. 1 illustrates an example (and simplified) wireless communication system 100, according to some embodiments. It is noted that the system 100 of FIG. 1 is merely one example of a possible system, and embodiments may be implemented in any of various systems, as desired. For example, note that although the example wireless communication system 100 illustrated in FIG. 1 is shown as including four wireless devices, aspects of the disclosure may be implemented in wireless communication systems having greater or lesser numbers (i.e., any arbitrary number) of wireless devices.

As shown, the example wireless communication system 100 includes multiple wireless devices 102-108 which communicate over a transmission medium. Some or all of the wireless devices may be substantially mobile devices ("stations" or "STAs"). Alternatively, or in addition, some or all of the wireless devices may be substantially stationary. The wireless devices 102-108 may operate in a Wi-Fi network according to aspects of the present disclosure.

The wireless devices 102-108 may communicate over the wireless transmission medium in such a manner as to form a wireless network. The wireless network may be an IEEE 802.11 network provided by a dedicated access point (e.g., wireless device 102); alternatively, the wireless network may be an 'ad-hoc' or peer-to-peer based network. At least one of the wireless devices 102-108 may be configured to determine its relative distance from another device using time-of-flight estimation (ToFE) with a convolutional neural network (CNN).

One or more of the wireless devices may be equipped to communicate with one or more external networks. For example, as shown, wireless device may be a Wi-Fi access point 102 that may be communicatively coupled to network 100. Note that one or more of the wireless devices 102-108 may be capable of communicating using multiple wireless communication standards. For example, one or more of the wireless devices 102-108 may be configured to communicate using at least one wireless networking protocol (e.g., Wi-Fi) and/or peer-to-peer wireless communication protocol (e.g., BT, Wi-Fi peer-to-peer, etc.) and at least one cellular communication protocol (e.g., GSM, UMTS, LTE, LTE-Advanced (LTE-A), 3GPP2 CDMA2000 (e.g., 1×RTT, 1×EV-DO, HRPD, eHRPD), etc.). Any or all of wireless devices 102-108 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates an example wireless communication system 200 in which aspects of the system 100 of FIG. 1 according to one possible implementation are represented, according to some embodiments. As shown, in the illustrated system wireless device 106 may be a mobile station (STA) 106 and wireless device 102 may be an access point 102 (also referred to as an "AP"). The STA 106 may be a user device as defined below with Wi-Fi communication capability such as a mobile phone, a hand-held device, a wearable device, a computer or a tablet, or virtually any type of wireless device. The AP 102 may be an access point device with Wi-Fi (or WLAN) communication capability such as a wireless router or other wireless access point.

Either or both of the AP 102 and the STA 106 (or any of the devices shown in FIG. 2) may include a processor that is configured to execute program instructions stored in memory. Either or both of the AP 102 and the STA 106 may perform any of the method embodiments described herein by executing such stored instructions, including performing time-of-flight estimation (ToFE) in conjunction with a convolutional neural network (CNN). Alternatively, or in addition, a programmable hardware element such as an FPGA (field-programmable gate array) that is configured to perform any of the method embodiments described herein, or any portion of any of the method embodiments described herein, may be included as part of the AP 102 and/or the STA 106.

Figure 3:
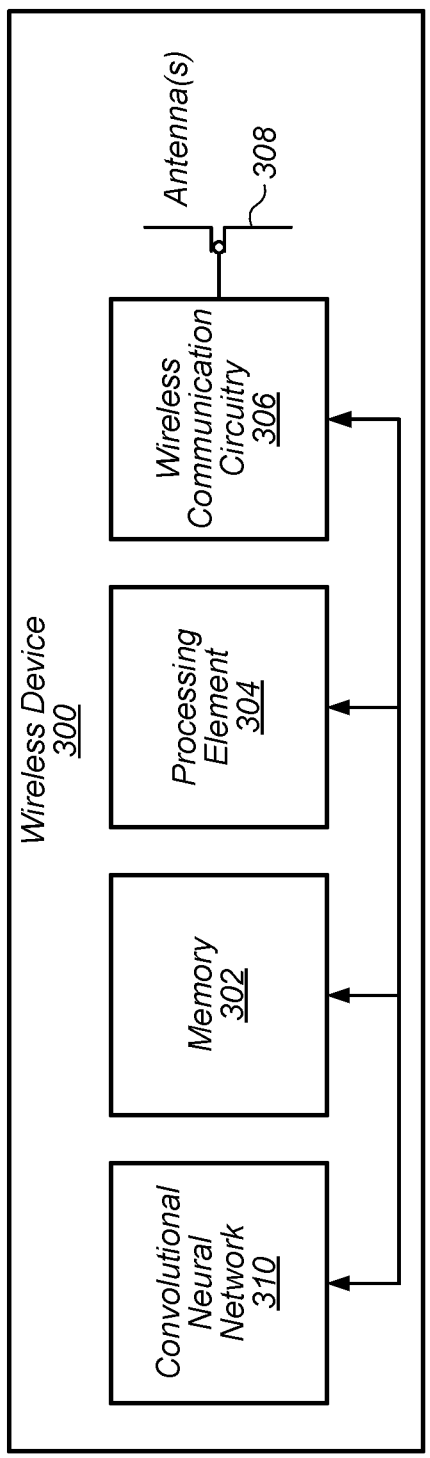
FIG. 3 illustrates a block diagram of an example wireless device, according to some embodiments.

FIG. 3—Example Block Diagram of a Wireless Device

FIG. 3 illustrates an example block diagram of a wireless device 300 which may be configured for use in conjunction with various aspects of the present disclosure, according to some embodiments. The device 300 may be any of a variety of types of devices and may be configured to perform any of a variety of types of functionality. For example, the device 300 may be an STA 106 as defined above and/or a W-Fi access point 102 as shown above.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types of memory and functions are also possible.

The device 300 may also include wireless communication circuitry 306. The wireless communication circuitry 306 may include analog and/or digital circuitry components, and may alternatively be referred to as a 'radio'. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the wireless device 300 may share one or more parts of a receive and/or transmit chain between multiple wireless communication technologies, such as those discussed above. The wireless communication circuitry may include or be coupled to one or more antennas 308.

Note that if desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may providing processing capability for the wireless communication circuitry 306. The device 300 may be capable of communicating using any of various wireless communication technologies by way of wireless communication circuitry 306 and antenna(s) 308.

The device 300 may additionally include a convolutional neural network (CNN) 310. The CNN 310 may be coupled to communicate with the processing element 304 and/or the memory 302. For example, the CNN 310 may be configured to receive inputs from and transmit outputs to the processing element 304. Alternatively, the CNN may be configured to obtain inputs directly from the memory 302 and to transmit outputs directly to the memory 302. In some embodiments, the CNN may be implemented in software and the processing element 304 may be configured to execute the CNN. In other embodiments, the CNN may be implemented in hardware, e.g., equipped with its own processor and/or memory for operation. As another possibility, the CNN may be implemented as an FPGA, among other possibilities. In other embodiments, the CNN may be located remotely from the device 300, but may be communicatively coupled to the device 300 to receive inputs and send outputs.

The CNN 310 may be preconfigured with a trained set of CNN parameters. In some embodiments, the CNN may be preconfigured with a plurality of sets of CNN parameters, and it may be configured to receive instructions from the processing element that determine which set of CNN parameters to use in a particular calculation or wireless environment. As described in further detail below, the sets of CNN parameters may include trained weight functions and bias functions to use in calculating an estimated line-of-sight from an impulse response estimate.

The device 300 may additionally include any of a variety of other components (not shown) for implementing device functionality, depending on the intended functionality of the device 300, which may include further processing and/or memory elements, one or more power supply elements (which may rely on battery power and/or an external power source), user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, wireless communication circuitry 306, convolutional neural network (CNN) 310 (e.g., when implemented in hardware), and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing features for performing time-of-flight estimation using a CNN as described herein.

Figure 4:
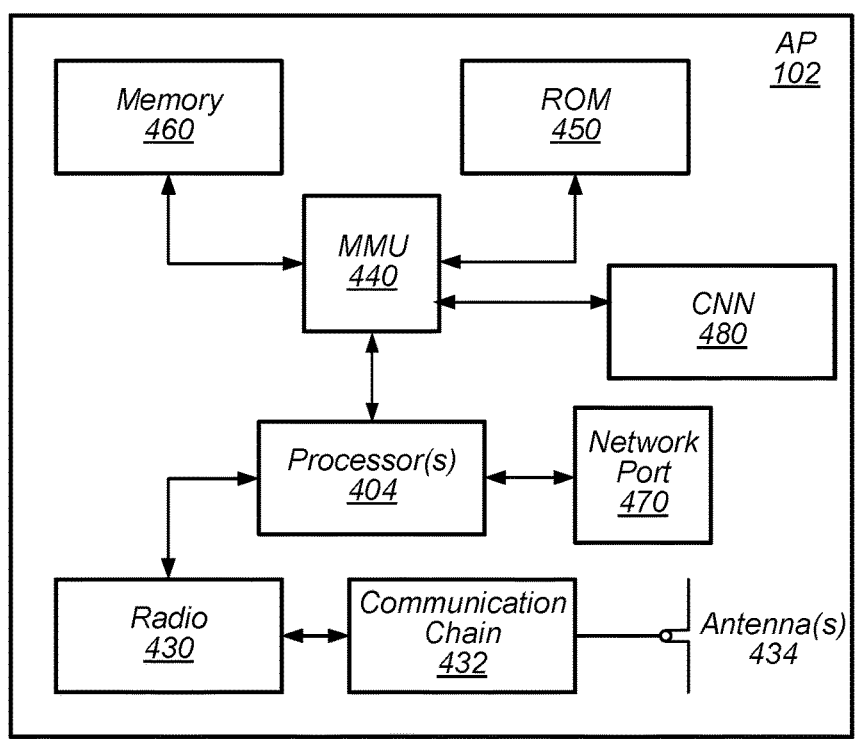
FIG. 4 illustrates a block diagram illustrating an example access point, according to some embodiments.

FIG. 4—Block Diagram of an Access Point

FIG. 4 illustrates an example block diagram of a wireless access point (AP) 102, according to some embodiments. It is noted that the AP of FIG. 4 is merely one example of a possible AP. As shown, the AP 102 may include processor(s) 404 which may execute program instructions for the AP 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The AP 102 may include at least one network port 470. The network port 470 may be configured to couple to a telephone network and provide a plurality of devices, such as wireless device 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as wireless device 106. In some cases, the network port 470 may couple to a telephone network via the core network, and/or the core network may provide a telephone network (e.g., among other wireless devices serviced by the cellular service provider).

The AP 102 may include at least one antenna 434, and possibly multiple antennas. The antenna(s) 434 may be configured to operate as a wireless transceiver and may be further configured to communicate with wireless device 106 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, Wi-Fi, Bluetooth, and/or various cellular communication protocols.

The AP 102 may additionally include a convolutional neural network (CNN) 480. The CNN 480 may be coupled to communicate with the processor(s) 404 and/or the memory 460. For example, the CNN 480 may be configured to receive inputs from and transmit outputs to the processor 404. Alternatively, the CNN may be configured to obtain inputs directly from the memory 460 and to transmit outputs directly to the memory 460. In some embodiments, the processor 404 may be configured to operate the CNN. In other embodiments, the CNN may be equipped with its own processor and/or memory to operate with. The CNN 480 may be preconfigured with a trained set of CNN parameters. In some embodiments, the CNN may be preconfigured with a plurality of sets of CNN parameters, and it may be configured to receive instructions from the processing element that determine which set of CNN parameters to use in a particular calculation. As described in further detail below, the sets of CNN parameters may include trained weight functions and bias functions to use in calculating an estimated line-of-sight from an impulse response estimate.

As described further subsequently herein, the AP 102 may include hardware and software components for implementing or supporting implementation of features described herein. The processor 404 of the AP 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the AP 102, in conjunction with one or more of the other components 430, 432, 434, 440, 450, 460, 470 may be configured to implement or support implementation of part or all of the features described herein.

Time-of-Flight Estimation Using Convolutional Neural Network

Time-of-flight (TOF) estimation is a method for measuring the distance between objects that include radio devices. Time-of-flight is herein considered to be the time it takes for a radio wave (e.g., carrying a message) to get from a transmitting station to a receiving station. A determination of the TOF may be used for ranging estimation to determine the distance between the devices, based on the simple equation:

$$\text{Distance} = c \cdot t, \quad (1)$$

wherein t is the time-of-flight and c is the speed of light, $c = 3 \cdot 10^8$ m/s.

In some embodiments, the radio signal may be transmitted through a dispersive or absorptive medium with an index of refraction greater than one. In these embodiments, the speed of light may be reduced below the speed of light in a vacuum, and the distance between devices may be computed using the actual speed of light in the dispersive medium.

Figure 5:
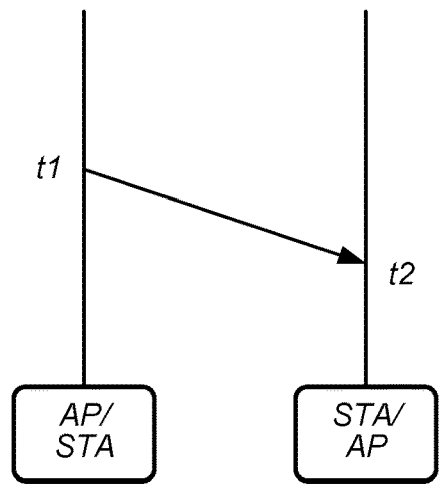
FIG. 5 is an example signal flow diagram of a one-way communication session, according to some embodiments.

FIG. 5 illustrates an access point (AP) or wireless station (STA) transmitting a wireless communication at time $t_1$, wherein a second AP or STA receives the communication at time $t_2$. In some embodiments, as illustrated in FIG. 5, the TOF may be computed from a single transmitted radio communication, as:

$$t = t_2 \cdot t_1, \quad (2)$$

wherein $t_2$ is the time of arrival of the communication, and $t_1$ is the time of transmission of the communication.

Figure 6:
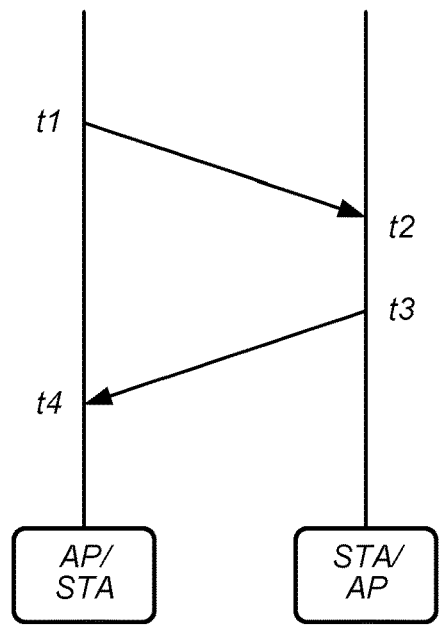
FIG. 6 is an example signal flow diagram of a round-trip communication session, according to some embodiments.

In other embodiments, as illustrated in FIG. 6, two unsynchronized devices may conduct a time-of-flight measurement using a round trip communication session. FIG. 6 illustrates an access point (AP) or wireless station (STA) transmitting a wireless communication at time $t_1$, wherein a second AP or STA receives the communication at time $t_2$. The second AP/STA then transmits a second wireless communication at a later time $t_3$, which is received by the first AP/STA at time $t_4$. In these embodiments, the TOF may be computed from a round-trip communication session between a first and second wireless device comprising both a first and a second communication. In these embodiments, the TOF may be calculated as the average of the TOF for each of the first and second messages. For example, if $t_1$ is the transmission time of the first communication, $t_2$ is the reception time of the first communication, $t_3$ is the transmission time of the second communication, and $t_4$ is the reception time of the second communication, the TOF may be calculated as:

$$ToF = \frac{1}{2}((t_2 - t_1) + (t_4 - t_3)) = \frac{1}{2}((t_4 - t_1) + (t_2 - t_3)), \quad (3)$$

wherein the second expression has grouped together variables that are separately known by the first and second devices, respectively.

Calculating Reception Time from a Limited Bandwidth Signal

In some embodiments, to measure the time of flight with high accuracy, it may be desirable for the receiving device to have a very accurate time of arrival (TOA) estimation. In a limited bandwidth (BW) signal, the temporal resolution of the arrival time of the signal may be limited by the bandwidth of the signal. In general, the temporal resolution of the arrival time of a limited BW signal is proportional to the inverse of the bandwidth, 1/BW. For example, a limited BW may lead to a broader received signal and a correspondingly larger uncertainty in the TOA estimation.

Furthermore, in many applications a signal may be transmitted through an unknown multipath channel. For example, a wireless communication may be transmitted indoors wherein, in addition to the direct line-of-sight (LOS) signal, the receiving device may also receive multiple other indirect signals at later times. For example, the receiving device may receive multiple other signals that have had their path altered, e.g. by reflecting off of or being diffracted through objects, such as walls, furniture, etc., thereby increasing their travel time. The limited temporal resolution of a limited BW signal combined with the reception of multiple signals from a single transmission may make it difficult to precisely and accurately determine the TOA.

Figure 7:
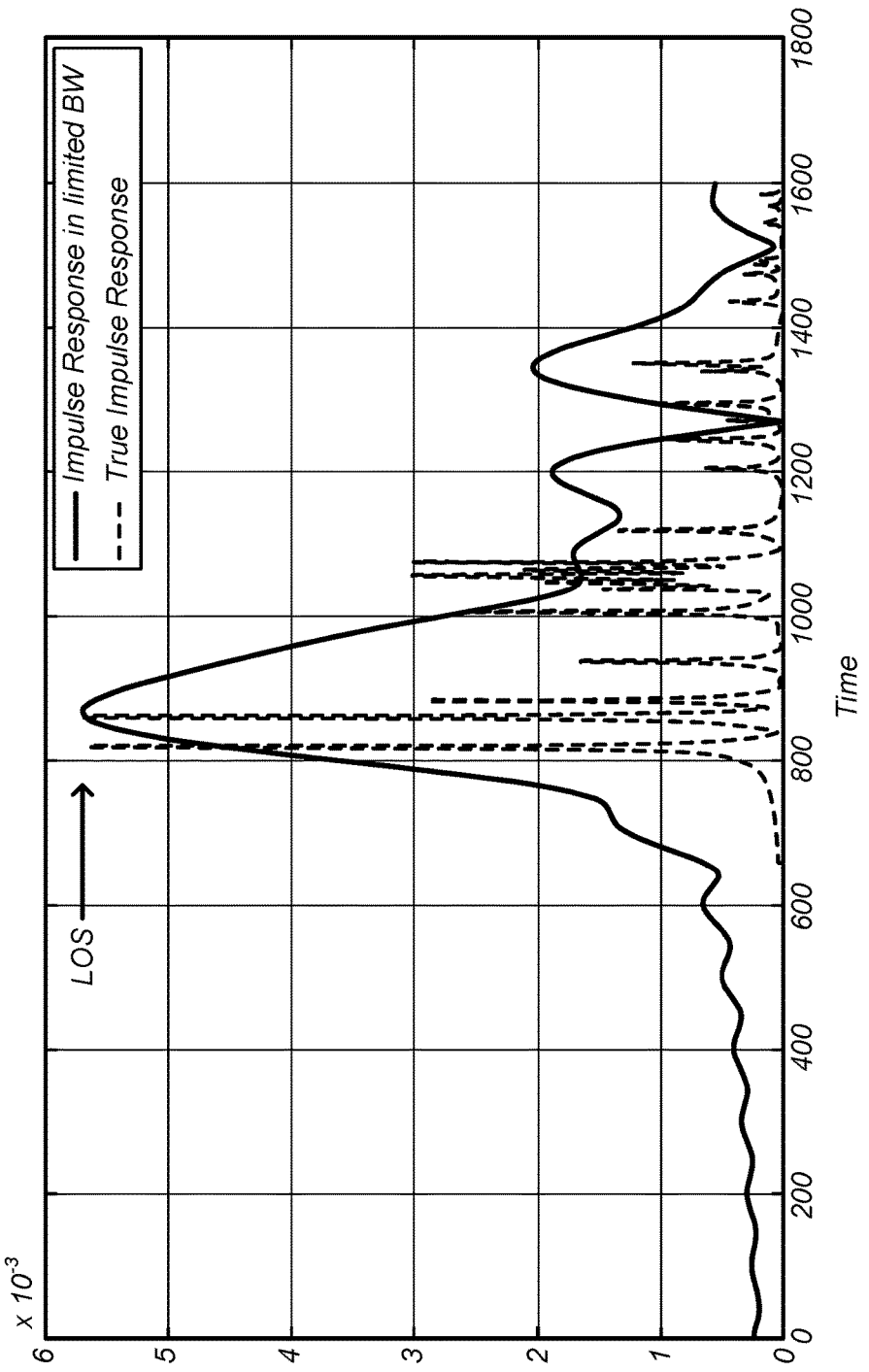
FIG. 7 is a graph of an exemplary impulse response from a limited bandwidth communication, compared with the 'true' impulse response, according to some embodiments.

FIG. 7 illustrates an exemplary impulse response (solid line) received from a limited BW signal, as well as the 'true' impulse response (dashed line) The term 'true' impulse response is intended to refer to the time which, when multiplied by the speed of light, equals the distances travelled by the multipath signal through Equation 1. When the desired timing resolution of the arrival time is much more precise than 1/BW, it may be desirable to use sub-Nyquist frequency processing.

When a signal is transmitted through an unknown multipath channel, an accurate TOA estimation may first require a LOS estimate (indicated by the arrow in FIG. 7). In other words, it may be desirable to deduce as precisely and accurately as possible the time of arrival of the first (direct) path of the multipath channel. The estimated time of arrival of the line of sight path may be equivalently referred to as a LOS estimate, or a LOS TOA estimate. When the temporal multipath density (i.e., the number of received multipath signals per time) is larger than the BW, it is considered "unresolvable", meaning that the received impulse response is unable to disambiguate the multiple received signals from one another. This "unresolvable state" problem may be resolved using cutting edge super-resolution algorithms, but such processing may invoke a heavy computational burden in both time and computational resources. Embodiments described herein employ a convolutional neural network (CNN), or 'deep learning', to more efficiently estimate the line of sight TOA from a limited bandwidth signal.

Figure 8:
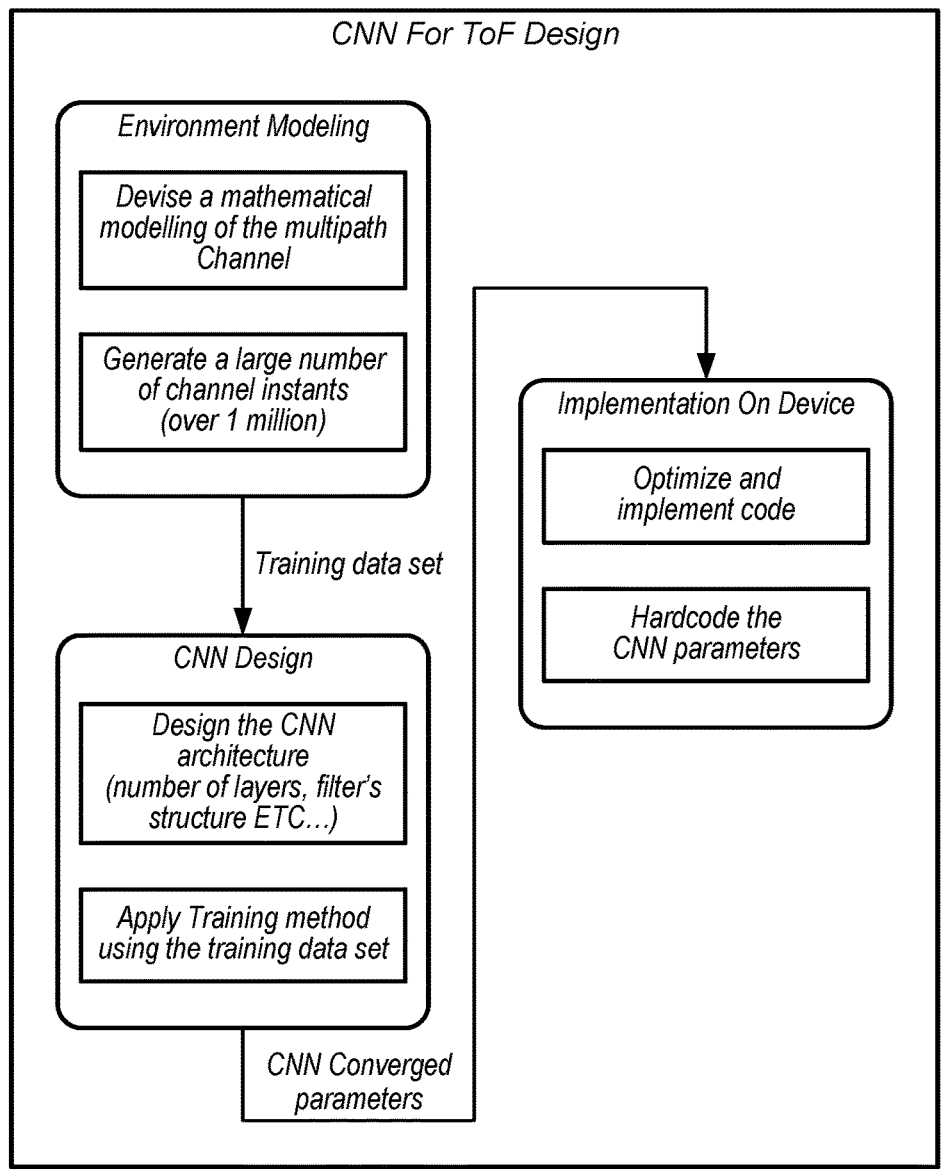
FIG. 8 is an example high-level flow diagram of the convolutional neural network design process, according to some embodiments.

FIG. 8—Designing a Convolutional Neural Network to Calculate LOS

FIG. 8 is a high-level flow diagram illustrating the design process for implementing methods described herein. As illustrated, environment modelling may be performed to derive a training data set to be used for training the CNN. In particular, mathematical modeling of one or more multipath channels may be derived. In addition, a large number of channel instants (e.g., over 1 million) may be generated.

In some embodiments, a convolutional neural network (CNN) may be pretrained to estimate line of sight timing using an impulse response estimation. In some embodiments, the CNN may be trained using the following operations.

In some embodiments, a large training data set may be created using measured multipath channel instants (and/or a simulation thereof). For example, the training data may include limited BW signals received through a multipath channel. In some embodiments, the training data may be measured from actual received multipath data in a particular multipath environment such as a room with furniture, a hallway, or an outdoors area with a high density of buildings (e.g., a downtown area), among other possibilities. In other embodiments, the multipath environment and the resultant multipath channel instants may be simulated and/or mathematically modelled on a computer. The training data may include a large number of multipath signal instances, e.g., millions or any other number, as desired. In some embodiments, a separate training data set may be created for each of a plurality of different multipath environments or for classes of different multipath environments. For example, separate training data sets may be created for rooms of different sizes and/or shapes, and containing different types and quantities of furniture. Alternatively or in addition, separate training data sets may be constructed based on the material properties (e.g., reflective and refractive properties) of the environment. For example, separate training data sets may be constructed for wallpapered environments, environments with wooden walls, environments with glass walls, etc. Alternatively or in addition, separate training data sets may be created for any/all of an 'empty room' type environment, a 'furnished room' type environment, a 'hallway' type environment, an outdoors environment with a high density of buildings (e.g., a downtown area), an office environment, and/or a residential environment, among other possibilities. The subsequent training of the CNN may then be separately performed for the different training data sets, leading to a plurality of trained CNN configurations for the plurality of different multipath environments.

In some embodiments, the method may proceed to design the CNN architecture. For example, the CNN may be configured with a particular number of layers and/or filters, each with a particular structure, to improve the application of the CNN to the training data set.

In some embodiments, the method may proceed to train the CNN offline using the large training data set. For example, the CNN may be trained in a factory setting before it is implemented inside the ranging wireless device. In other embodiments, the CNN may be trained or retrained in the field after it is configured inside the ranging wireless device. In some embodiments, training the CNN may involve altering weights and/or filters in the CNN to reduce (or minimize) an error function for elements in the training data set. For example, a training algorithm may attempt to reduce a difference between the known LOS distance of elements of the training data set and the determined output LOS distance of the CNN. In some embodiments, the training may proceed until the CNN parameters converge to a stable set of CNN parameters. Training the CNN may result in a set of CNN parameters that may be preconfigured on the CNN.

In some embodiments, the final layer of the CNN may include a single filter, and the single filter may include the LOS time estimate. The LOS estimate may be compared to the (known) LOS associated with the training data to compute a loss function. In some embodiments, a gradient function may be calculated in the space of weight and bias functions. Backpropagation may be employed, wherein the gradient function is used to adjust the weight and bias functions in such a way as to minimize the loss function. After completion of back propagation, the training process may iteratively repeat in a series of subsequent epochs, wherein each epoch recovers a LOS estimate from training data, performs backpropagation, and adjusts the weight and bias functions to reduce (or minimize) a loss function.

Finally, the CNN may be implemented on a wireless device with a converged set of CNN parameters. As shown, the code for the CNN may be optimized and implemented for the wireless device. Additionally, the parameters may be hardcoded on the device, for use in calculating a LOS from an impulse response estimate.

After the CNN has been trained, it may be refined (or tuned) and implemented on a wireless device for determining a range (or equivalently, a distance) between the wireless device and another device. The implementation of the trained CNN on a wireless device may be customized (e.g., optimized) for the specific hardware on the wireless device. For example, in some embodiments the CNN may be implemented to exploit any hardware accelerators present on the wireless device. Alternatively or in addition, the implementation may take into consideration any hardware constraints present on the wireless device. For example, if the hardware on the wireless device is not powerful enough to run the full CNN network, the implementation may be simplified while retaining as much of the performance of the CNN as possible. Other examples are also possible, as is clear to one of skill in the art.

Finally, the implementation of the trained CNN on the wireless device may involve hardcoding any/all of the CNN parameters. For example, during production of the configured wireless device, the determined implementation may be hardcoded into the CNN device on the wireless device.

Figure 9:
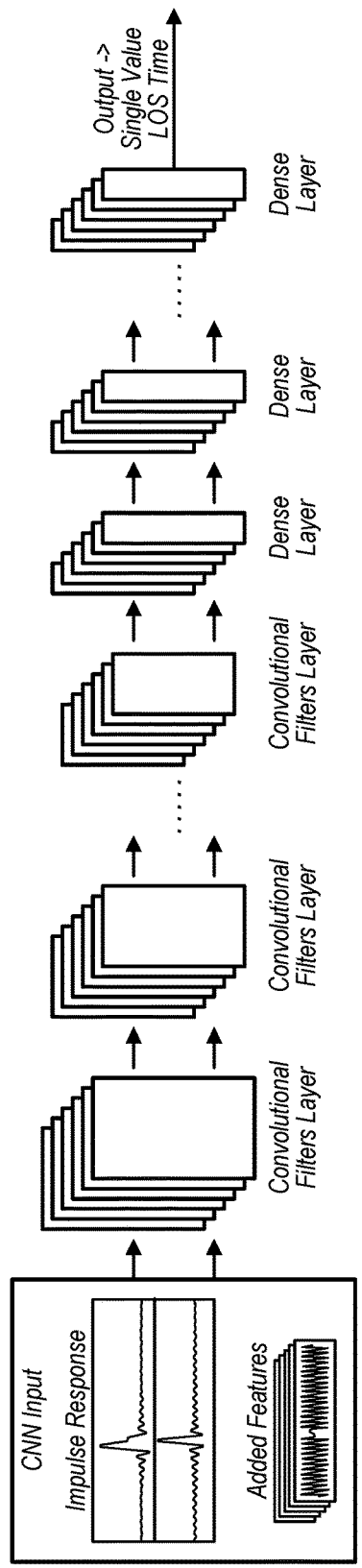
FIG. 9 is a schematic illustration of an example convolutional neural network, according to some embodiments.

FIG. 9—Convolutional Neural Network Architecture

FIG. 9 is a schematic illustration of a convolutional neural network, according to some embodiments. As illustrated, the CNN receives as input an impulse response estimate and potentially additional added features based on the impulse response estimate, as described in greater detail below. The impulse response estimate may be processed through a series of convolutional filter layers, according to the pre-trained set of CNN parameters. A convolutional filter layer (or convolutional layer) is a specific structure of a neural network in which the neurons are connected in a filter-like structure (e.g., analogous to the connection between adjacent neurons).

In some embodiments, the signal proxy may be processed by a series of subsequent layers in the CNN. Each layer may have one or more filters and channels, wherein filters of subsequent layers include sequentially higher-order feature maps, and channels include dependencies of filters on previous layers. Each filter may include a vector of data points that is the same size as the signal proxy (hence, it may also be the same size as the reference signal). Each channel may connect a particular data point in a particular filter to a subset of data points in a localized region in a filter within a previous layer. This distinguishes these embodiments from 'fully-connected' layers, wherein a channel connects a data point to all data points in a previous layer. This sparse connectivity between layers may significantly reduce training time, and may also prevent overfitting. Note, however, that fully-connected layers may be implemented in other embodiments.

In some embodiments, processing the CNN input at a particular layer may include, by any/all filters in the layer, and for any/all data points in a respective filter, applying a weight function and a bias function to the subset of data points connected by each channel. The weight and bias functions may be set to an initial value based on the trained CNN parameters. In some embodiments, a single weight function may be shared between all data points in a particular filter. As one nonlimiting example, this may reduce the time and computational resources required to complete the training procedure. Each filter may then apply the same weight function to all of its data points, in these embodiments.

Subsequently, the CNN may input the processed data into a series of one or more 'dense layers'. The one or more dense layers may represent a fully connected structure, in which all connections are enabled. In some embodiments, dense layers are used as the last layer (or the several last layers), in order to produce the final single output from the vectors that are passed between the convolutional layers. Finally, in some embodiments the CNN may output a single value LOS time estimate based on the CNN input.

Figure 10:
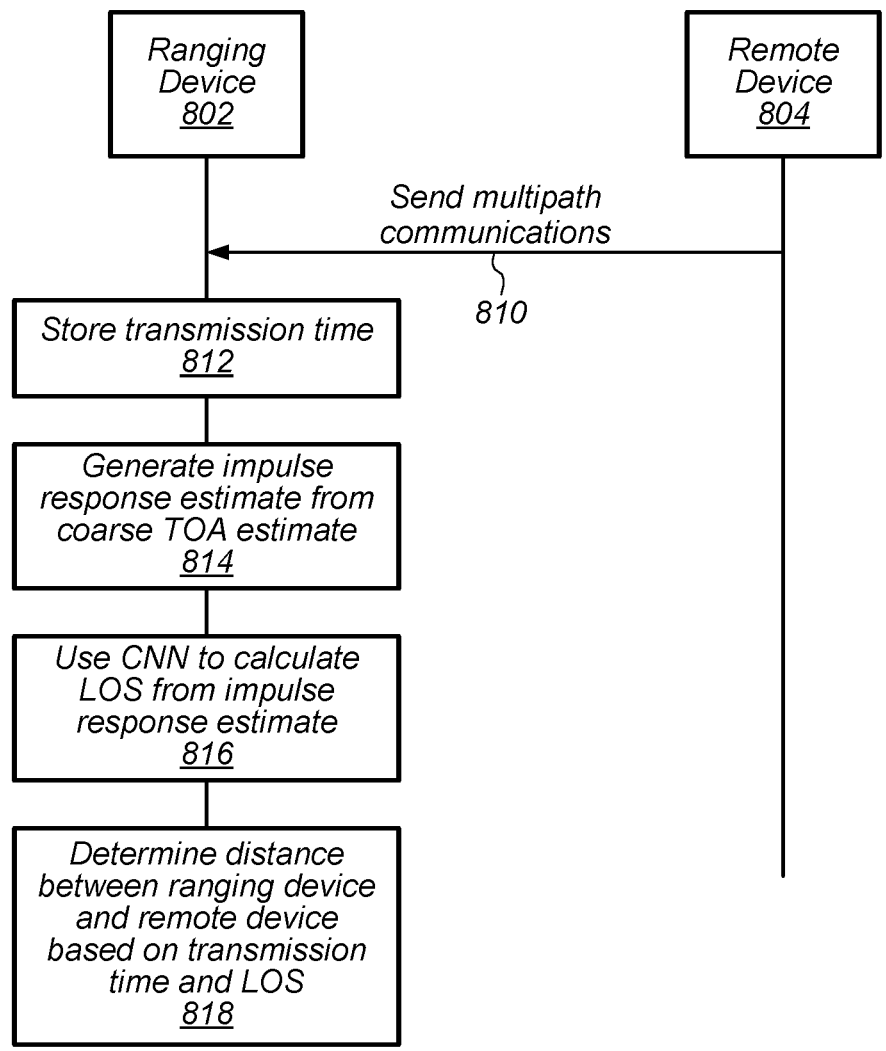
FIG. 10 is a flow diagram illustrating an exemplary method for performing a ranging calculation from a one-way communication session, according to some embodiments.

FIG. 10—Using a Trained CNN to Estimate LOS—One Way Communication

FIG. 10 is a flowchart diagram illustrating an example method for determining the distance between a ranging device and a remote device using a single multipath communication from a remote device to a ranging device. The ranging device and the remote device each may be a wireless device, such as the wireless device 300, any of the wireless devices 104-108, or the access point 102. In these embodiments, the ranging device may be configured to conduct time-of-flight measurements using the CNN as follows.

At 810, the ranging device may receive a multipath wireless communication from a remote device, wherein the wireless communications may be bandwidth limited. The received wireless communication may include a transmission time value associated with the received wireless communication. For example, the received wireless communication may include a time stamp or other indication of the time of transmission of the communication by the remote device.

At 812, the ranging device may store the transmission time value in a memory.

The ranging device may generate a coarse estimation of the TOA of the received wireless communication. At 814, the ranging device may create an impulse response estimation of the multipath channel around the generated coarse TOA estimation. For example, the ranging device may create an impulse response estimate that reflects the received signal strength in the temporal vicinity of the TOA estimation.

In some embodiments, the ranging device may generate a set of features of the impulse response estimate as inputs to the CNN. The generated features may serve to assist the CNN in calculating a line of sight estimate. Features that may be generated may include, but are not limited to, any/all of the following quantities:

The ranging device may generate an amplitude associated with the impulse response estimate. For example, the ranging device may generate an average, maximum, or minimum amplitude of the impulse response estimate.

The ranging device may generate phase information associated with the impulse response estimate. The phase information may include, or may be useable by the CNN to determine, a number and location of peaks, troughs, and/or inflection points of the impulse response estimate.

The ranging device may generate a fast-Fourier transform (FFT) of the impulse response estimate.

The ranging device may generate a coarse LOS estimate using other algorithms. For example, the ranging device may generate a coarse LOS estimate based on a maximum of the impulse response estimate.

The ranging device may generate a multipath environment classifier based on the impulse response estimate. The multipath environment classifier may identify particular features of the multipath environment, as enumerated above.

The ranging device may generate an interpolation of the impulse response to a higher sample frequency. For example, the ranging device may interpolate the impulse response to a frequency higher than was received in the impulse response estimate.

In some embodiments, after generating the impulse response estimate and potentially generating any of the above-mentioned features based on the impulse response estimate, at 816, the ranging device may pass the impulse response estimate and/or the generated features to the CNN. This step is additionally illustrated in FIG. 9. The method may then proceed to run the CNN on the received data and using the preconfigured set of training parameters to calculate a LOS estimate. For example, as illustrated in FIG. 9, the CNN input may be processed through a series of convolutional filter layers and subsequent dense layers using the pretrained CNN configuration to generate on output LOS estimate.

In some embodiments, after the CNN has calculated a LOS estimate, it may output the LOS estimate to a processor of the ranging device for use in determining the distance between the ranging device and the remote device. Then, at 818, the ranging device may calculate the distance between the ranging device and the remote device using the stored transmission time value, the LOS estimate, and equations 1 and 2.

Figure 11:
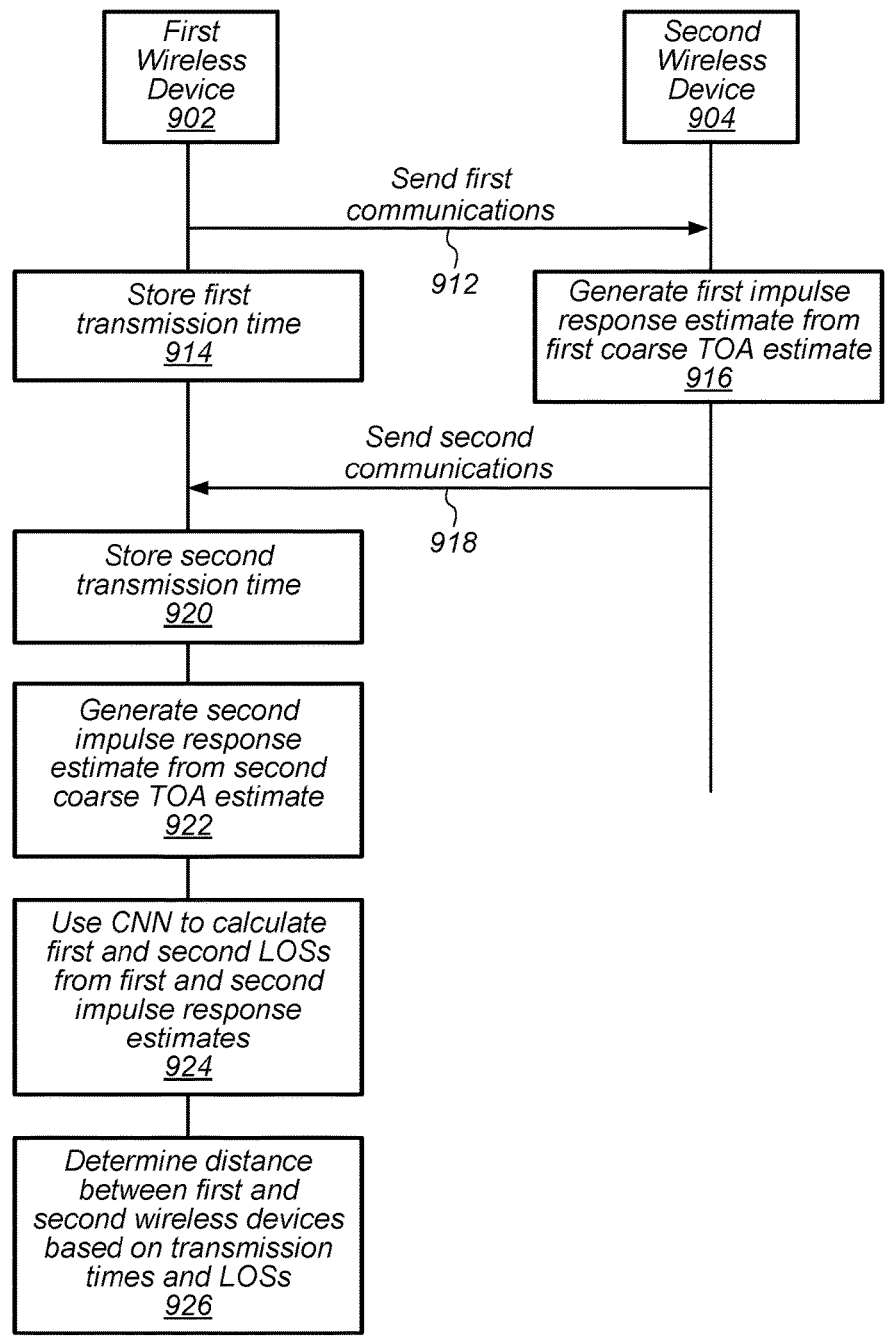
FIG. 11 is a flow diagram illustrating an exemplary method for performing a ranging calculation from a round-trip communication session, according to some embodiments.

FIG. 11—Using a Trained CNN to Estimate LOS—Round Trip Communication

FIG. 11 is an example flowchart diagram illustrating how first and second wireless devices may use a trained CNN to calculate the distance between the first and second wireless devices using round-trip communication. In these embodiments, the first 902 and second 904 wireless devices may be configured to calculate the distance in a manner similar to the one-way communication method, but with separate LOS calculations for each of a pair of wireless communications in a round-trip communication session. The distance between the two devices may then be calculated according to equations 1 and 3. In other words, the distance may be calculated as the average distance calculated for each of the two wireless communications. Specifically, the method may proceed as follows.

In some embodiments, at 912, the method may begin by the first wireless device transmitting first wireless communications to the second wireless device. The first wireless communications may be similar in form to the multipath wireless communication used in the one-way communication method. For example, the first wireless communications may be a bandwidth limited multipath communication having a first transmission time value.

Alternatively or in addition, at 914 the first wireless device may store the first transmission time value upon transmission of the first wireless communications. For example, the first wireless device may store a time stamp or other indicator of the transmission time as the transmission time value.

The second wireless device may receive the first wireless communications and may perform coarse TOA estimation on the received communications, similar to that described above. At 916, the second wireless device may generate a first estimated impulse response based on the first wireless communications (e.g., based on the coarse TOA estimate), and/or may generate first features based on the first estimated impulse response such as those listed above for the one-way communication method.

In some embodiments, the method may proceed similarly to the one-way communication method, in that the second wireless device may send the first estimated impulse response and/or first generated features based on the first estimated impulse response to a CNN of the second wireless device. Alternatively, the CNN may be included within the first wireless device, and the second wireless device may transmit wireless communications to the first wireless device including the first estimated impulse response and/or first generated features based on the first estimated impulse response. In either of these embodiments, the CNN may calculate a first LOS estimate using preconfigured parameters based on the received first estimated impulse response and/or the first generated features.

At 918, the second wireless device may transmit a second wireless communication to the first wireless device. The second wireless communications may be similar in form to the multipath wireless communication used in the one-way communication method. For example, the second wireless communication may be a bandwidth limited multipath communication having a second transmission time value. Alternatively or in addition, in some embodiments, the second wireless device may record the second transmission time value upon transmission of the second wireless communications. In some embodiments, the first LOS estimate may be included as part of the second wireless communication. Alternatively, in other embodiments, the first estimated impulse response and/or the first generated features based on the first estimated impulse response may be included as part of the second wireless communication.

At 920, the first wireless device may receive the second wireless communication and store the second transmission time value included within the second wireless communication. For example, the first wireless device may store a time stamp or other indicator of the transmission time as the second transmission time value.

At 922, the first wireless device may perform coarse TOA estimation on the second wireless communications, which may be performed similarly to in the one-way communication method. For example, the first wireless device may generate a second estimated impulse response based on the first wireless communications, and/or may generate second features based on the second estimated impulse response such as those listed above for the one-way communication method.

At 924, the first wireless device may send the second estimated impulse response and/or second generated features based on the second estimated impulse response to a CNN included within the first wireless device. The CNN may calculate a second LOS estimate using preconfigured parameters and based on the received second estimated impulse response and/or the second generated features. For embodiments in which the second wireless device transmitted wireless communications to the first wireless device that include the first estimated impulse response and/or first generated features based on the first estimated impulse response, the first wireless device may further send the first estimated impulse response and/or the first generated features to the CNN. In these embodiments, the CNN may additionally calculate a first LOS estimate using preconfigured parameters based on the received first estimated impulse response and/or the first generated features.

In some embodiments, after the CNN has calculated the first and/or the second LOS estimates, it may output the LOS estimate(s) to a processor of the first wireless device for use in determining the distance between the first wireless device and the second wireless device. At 926, the first wireless device may calculate the distance between the first wireless device and the second wireless device using the first and second transmission time values, the first and second LOS estimates, and equations 1 and 3.

While embodiments described above specifically indicate that one of the first or second wireless devices perform each of the specific respective storing, perform, and generating steps enumerated above, it may be understood that the other of the first or second wireless devices may likewise be configured to perform each of these steps. For example, embodiments described above have the distance calculation performed at the first wireless device, but all or part of this calculation may likewise be performed at the second wireless device, as desired. Other allocations of the previously described steps are also possible, as would be apparent to one of skill in the art.

Multiple CNN Configurations for a Plurality of Multipath Environments

In some embodiments, several CNN configurations may be created for a plurality of multipath environments or multipath environment classes. As described above, the training of the CNN may be separately performed for each of a plurality of training data sets corresponding to a plurality of different multipath environments and/or multipath environment classes, leading to a plurality of trained CNN configurations for each of the plurality of different multipath environments and/or multipath environment classes.

In various embodiments, any of the ranging device, the remote device, or the first or second wireless devices may determine a classification of the multipath environment based on the estimated impulse response (which may be either the first or second estimated impulse response, as appropriate), and chose which CNN configuration to use based on the determined multipath environment. For example, the wireless device may be configured to identify particular types of impulse responses as corresponding to particular types of multipath environments, as described previously.

In other embodiments, the remote device may be a fixed device, such as a wireless local area network access point. In these embodiments, the remote device may be preconfigured with a multipath environment classifier based on its location. In these embodiments, the remote device may include the multipath environment classifier in the multipath wireless communications. Alternatively, any of the ranging device, the remote device, or the first or second wireless devices may receive the multipath environment classifier from a remote location, such as a remote server or network.

In these embodiments, the CNN that calculates the LOS estimate may receive the multipath environment classifier and calculate the LOS estimate using a set of CNN parameters that correspond to the multipath environment classifier. In some embodiments, this may improve the computational burden and accuracy of the LOS calculation, as the CNN parameters may be customized for the particular local environment.

Figure 12:
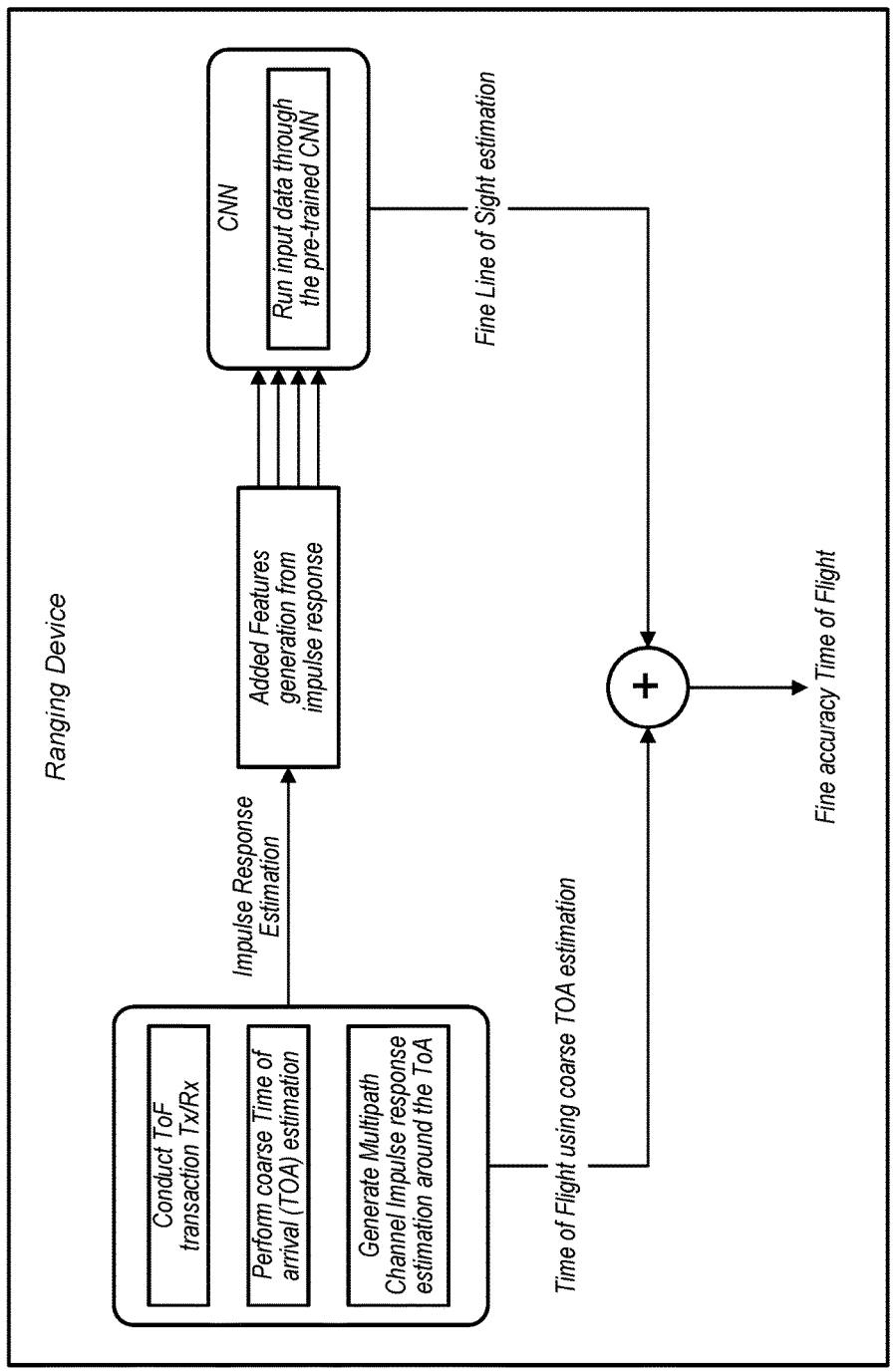
FIG. 12 illustrates an example method for calculating time-of-flight using a convolutional neural network, according to some embodiments.

FIG. 12—Time-of-Flight Using CNN Flow

FIG. 12 is a flow diagram illustrating an exemplary, non-limiting method for calculating a time-of-flight by a ranging device using a CNN. While FIG. 12 illustrates one example for accomplishing the time-of-flight calculation, other methods, as detailed elsewhere in this disclosure, are also possible.

In the embodiment of FIG. 12, the ranging device may conduct time of flight transaction (Tx/Rx). Additionally, the ranging device may perform coarse time of arrival (ToA) estimation. Further, the ranging device may generate multipath channel impulse response estimation around the ToA.

The impulse response estimation may be input to the CNN, which may process the input data using the pre-trained parameters. The ranging device may further generate added features from the impulse response estimation (e.g., as described above), which may additionally be input to the CNN.

The output of the ranging device and the CNN may be used to determine the fine accuracy TOF. For example, the ranging device may initially determine a TOF using a coarse TOA estimation. Once the CNN has completed a fine line of sight (LOS) estimation, it may output the fine line of sight (LOS) estimation, which may be used to improve the accuracy of the coarse TOA estimation, resulting in a fine accuracy TOF. The coarse TOA estimation may be calculated by the ranging device more quickly than the fine LOS estimate, such that the ranging device may operate according to the coarse TOF until the fine LOS estimation is received from the CNN.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method, comprising:
by a wireless device:
receiving wireless communications from a remote device;
storing a first transmission time value associated with the received wireless communications;
performing coarse time of arrival (TOA) estimation on the received wireless communications to generate a first estimated impulse response;
calculating, by a convolutional neural network (CNN) associated with the wireless device, a first line of sight (LOS) estimate, wherein in said calculating the CNN utilizes a first preconfigured set of CNN parameters, and wherein, in said calculating, the CNN receives as an input the first estimated impulse response; and
determining a range between the first wireless device and the remote device based on the first LOS estimate and the first transmission time value.

2. The method of claim 1, wherein the first preconfigured set of CNN parameters is trained based at least in part on a multipath training data set.

3. The method of claim 1, wherein the first preconfigured set of CNN parameters is selected from a plurality of sets of CNN parameters based at least in part on a multipath environment classifier received from the remote device.

4. The method of claim 1, the method further comprising:
generating one or more characteristics from the first estimated impulse response, wherein the one or more characteristics include one or more of:
an average power of the first estimated impulse response;
a location of a maximum power in the first estimated impulse response;
a location of a minimum power in the first estimated impulse response;
phase information associated with the first estimated impulse response;
a fast Fourier transform of the first estimated impulse response;
a coarse LOS estimate for the first estimated impulse response;
a multipath environment classifier; or
an interpolation of the impulse response to a higher sample frequency; and
wherein the CNN further receives as an input the generated one or more characteristics.

5. The method of claim 1,
wherein the remote device is a local area network access point.

6. The method of claim 1, further comprising:
prior to said receiving wireless communications from the remote device,
transmitting, by the wireless device, wireless communications to the remote device; and
storing a second transmission time value associated with the transmitted wireless communications to the remote device;
wherein the received wireless communications further comprise a second estimated impulse response associated with the transmitted wireless communications;
wherein said calculating further comprises calculating a second LOS estimate based at least in part on the second estimated impulse response and a second preconfigured set of CNN parameters; and
wherein said determining the range between the wireless device and the remote entity is further based on the second LOS estimate and the second transmission time value.

7. The method of claim 1, the method further comprising:
prior to said receiving wireless communications from the remote device,
transmitting, by the wireless device, wireless communications to the remote device; and
storing a second transmission time value associated with the transmitted wireless communications;
wherein the received wireless communications further comprises a second fine LOS estimate associated with the transmitted wireless communications;
wherein said determining the range between the wireless device and the remote entity is further based on the second fine LOS estimation and the second transmission time value.

8. A wireless device, comprising:
a radio;
a convolutional neural network (CNN);
a processing element communicatively coupled to the radio and the CNN;
wherein the radio, the CNN, and the processing element are configured to:
receive wireless communications from a remote device;
store a first transmission time value associated with the received wireless communications;
perform coarse time of arrival (TOA) estimation on the received wireless communications to generate a first estimated impulse response;
calculate, by the CNN, a first line of sight (LOS) estimate, wherein in said calculating the CNN utilizes a first preconfigured set of CNN parameters, and wherein in said calculating the CNN receives as an input the first estimated impulse response; and
determine a range between the first wireless device and the remote device based on the first LOS estimate and the first transmission time value.

9. The wireless device of claim 8, wherein the first preconfigured set of CNN parameters is trained based on a multipath training data set.

10. The wireless device of claim 8, wherein the first preconfigured set of CNN parameters is selected from a plurality of sets of CNN parameters, wherein the first preconfigured set of CNN parameters is selected based on a multipath environment classifier received from the remote device.

11. The wireless device of claim 8, wherein the radio, the CNN, and the processing element are further configured to:
generate one or more characteristics from the first estimated impulse response, wherein the one or more characteristics include one or more of:
an average power of the first estimated impulse response;
a location of a maximum power in the first estimated impulse response;
a location of a minimum power in the first estimated impulse response;
phase information associated with the first estimated impulse response;
a fast Fourier transform of the first estimated impulse response;
a coarse LOS estimate for the first estimated impulse response;
a multipath environment classifier; and
an interpolation of the impulse response to a higher sample frequency;
wherein, in said calculating, the CNN further receives as an input the one or more characteristics.

12. The wireless device of claim 8,
wherein the remote device is a local area network access point.

13. The wireless device of claim 8, wherein the radio, the CNN, and the processing element are further configured to:
prior to said receiving wireless communications from the remote device,
transmit wireless communications to the remote device; and
store a second transmission time value associated with the transmitted wireless communications;
wherein the received wireless communication further comprises a second estimated impulse response associated with the transmitted wireless communications;
wherein said calculating further comprises calculating a second LOS estimate based on the second estimated impulse response and a second preconfigured set of CNN parameters; and
wherein said determining the range between the wireless device and the remote entity is further based on the second LOS estimate and the second transmission time value.

14. The wireless device of claim 8,
prior to said receiving wireless communications from the remote device,
transmitting, by the wireless device, wireless communications to the remote device; and
storing a second transmission time value associated with the transmitted wireless communications;
wherein the received wireless communication further comprises a second fine LOS estimate associated with the transmitted wireless communication;
wherein said determining the range between the wireless device and the remote entity is further based on the second fine LOS estimation and the second transmission time value.

15. A method, comprising:
transmitting, by a first wireless device, first wireless communications to a second wireless device;
storing a first transmission time value associated with the first wireless communications;
receiving, by the first wireless device, second wireless communications from the second wireless device;
storing a second transmission time value associated with the second wireless communication;
performing coarse time of arrival (TOA) estimation on the first wireless communications to generate a first estimated impulse response;
performing coarse time of arrival (TOA) estimation on the second wireless communications to generate a second estimated impulse response;
calculating, by a first convolutional neural network (CNN), a first line of sight (LOS) estimate, wherein in said calculating the first CNN utilizes a first preconfigured set of CNN parameters, and wherein in said calculating the first CNN receives as an input the first estimated impulse response;
calculating, by a second convolutional neural network (CNN), a second line of sight (LOS) estimate, wherein in said calculating the second CNN utilizes a second preconfigured set of CNN parameters, and wherein in said calculating the second CNN receives as an input the second estimated impulse response; and
determining a range between the first wireless device and the second wireless device based on the first transmission time value, the second transmission time value, the first LOS estimate, and the second LOS estimate.

16. The method of claim 15, wherein the first and second preconfigured sets of CNN parameters are trained based on a multipath training data set.

17. The method of claim 15, wherein the first and second preconfigured sets of CNN parameters are selected from a plurality of sets of CNN parameters, wherein the first and second preconfigured sets of CNN parameters are selected based on a first and second multipath environment classifier, respectively.

18. The method of claim 15, the method further comprising:
generating one or more characteristics from the first and second estimated impulse responses, wherein the one or more characteristics include:

an average power of the first or second estimated impulse responses;

a location of a maximum power in the first or second estimated impulse responses;

a location of a minimum power in the first or second estimated impulse responses;

phase information associated with the first or second estimated impulse responses;

a fast Fourier transform of the first or second estimated impulse responses;

a coarse LOS estimate for the first or second estimated impulse responses a first or second multipath environment classifier corresponding to the first or second wireless communications, respectively;

an interpolation of the first or second estimated impulse responses to a higher sample frequency; and wherein in said calculating the first and second CNNs further receive as an input respective ones of the one or more characteristics.

19. The method of claim 15, wherein the first CNN is comprised within the second wireless device, and the second CNN is comprised within the first wireless device; and wherein the first LOS estimate is included in the second wireless communications.

20. The method of claim 15, wherein the first CNN and the second CNN are the same CNN comprised within the first wireless device.

* * * * *